United States Patent
Gandhi et al.

(10) Patent No.: US 12,495,001 B2
(45) Date of Patent: Dec. 9, 2025

(54) CAPACITY AWARE LOAD PACKING FOR LAYER-4 LOAD BALANCER

(71) Applicant: Microsoft Technology Licensing, LLC, Redmond, WA (US)

(72) Inventors: Rohan Gandhi, Maharashtra (IN); Venkata N. Padmanabhan, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 18/199,110

(22) Filed: May 18, 2023

(65) Prior Publication Data
US 2024/0388535 A1   Nov. 21, 2024

(51) Int. Cl.
*H04L 47/125* (2022.01)
*H04L 43/0852* (2022.01)

(52) U.S. Cl.
CPC ........ *H04L 47/125* (2013.01); *H04L 43/0852* (2013.01)

(58) Field of Classification Search
CPC ............................ H04L 47/125; H04L 43/0852
See application file for complete search history.

(56) References Cited

U.S. PATENT DOCUMENTS

| | | | |
|---|---|---|---|
| 11,757,983 B1* | 9/2023 | Pandey | H04L 67/101 709/226 |
| 12,052,182 B2* | 7/2024 | Vedam | H04L 47/83 |
| 2010/0302940 A1* | 12/2010 | Patel | H04L 45/04 370/230 |
| 2013/0159487 A1* | 6/2013 | Patel | H04L 61/5007 709/238 |
| 2015/0271075 A1* | 9/2015 | Zhang | H04L 45/7453 370/235 |
| 2016/0127250 A1* | 5/2016 | McCormick | H04L 43/0852 370/235 |
| 2022/0360532 A1* | 11/2022 | Viet | H04L 47/125 |

OTHER PUBLICATIONS

Aghdai et al., "Spotlight: Scalable Transport Layer Load Balancing for Data Center Networks", arXiv:1806.08455v3, Feb. 23, 2019, 14 pages.
International Search Report and Written Opinion received for PCT Application No. PCT/US2024/026116, mailed on Aug. 2, 2024, 15 pages.

(Continued)

*Primary Examiner* — Rachel J Hackenberg
(74) *Attorney, Agent, or Firm* — Ray Quinney & Nebeker P.C.; Tiffany B. Healy

(57) ABSTRACT

The present disclosure relates to methods and systems for load balancing traffic per the capacities of direct IPs (DIPs). The methods and systems use latency measurements from each DIP to determine the capacity of each DIP. The methods and systems use the latency measurements to determine the weights for each DIP using an Integer Linear Program (ILP). The weights identify an amount of traffic to provide to each DIP. The methods and systems provide the weights for each DIP to a load balancer controller to program the load balancer dataplane with the weights.

20 Claims, 6 Drawing Sheets

(56) References Cited

OTHER PUBLICATIONS

"Amazon Elastic Compute Cloud", Retrieved from: https://docs.aws.amazon.com/AWSEC2/latest/UserGuide/burstable-performance-instances.html, Retrieved Date: Feb. 6, 2023, 2094 Pages.
"Azure Cache for Redis", Retrieved from: https://azure.microsoft.com/en-in/products/cache/, Retrieved Date: Feb. 6, 2023, 8 Pages.
"COIN-OR", Retrieved from: https://www.coin-or.org/, Retrieved Date: Feb. 6, 2023, 2 Pages.
"HAProxy", Retrieved from: https://www.haproxy.org/, Retrieved Date: Feb. 6, 2023, 3 Pages.
"Load Balancing", Retrieved from: https://www.haproxy.com/solutions/load-balancing/, Retrieved Date: Feb. 6, 2023, 25 Pages.
"Optimization with PuLP", Retrieved from: https://coin-or.github.io/pulp/, Retrieved Date: Feb. 6, 2023, 2 Pages.
"Redis", Retrieved from: https://redis.io/, Retrieved Date: Feb. 6, 2023, 9 Pages.
"TCP and UDP Load Balancing", Retrieved from: https://docs.nginx.com/nginx/admin-guide/load-balancer/tcp-udp-load-balancer/, Retrieved Date: Feb. 6, 2023, 9 Pages.
"Traffic Manager documentation", Retrieved from: https://learn.microsoft.com/en-us/azure/traffic-manager/, Retrieved Date: Feb. 6, 2023, 2 Pages.
"VMware NSX Advanced Load Balancer", Retrieved from: https://nsx.techzone.vmware.com/resource/vmware-nsx-advanced-load-balancer-avi#section1, Retrieved Date: Feb. 6, 2023, 9 Pages.
Ambati, et al., "Providing SLOs for Resource-Harvesting VMs in Cloud Platforms", In Proceedings of 14th USENIX Symposium on Operating Systems Design and Implementation, Nov. 4, 2020, pp. 753-768.
Zeng, et al., "Tiara: A scalable and efficient hardware acceleration architecture for stateful layer-4 load balancing", In Proceedings of 19th USENIX Symposium on Networked Systems Design and Implementation, Apr. 4, 2022, 14 Pages.
Barbette, et al., "A High-Speed Load-Balancer Design with Guaranteed Per-Connection-Consistency.", In Proceedings of 17th USENIX Symposium on Networked Systems Design and Implementation, Feb. 25, 2020, pp. 667-683.
Bender, et al., "Azure Load Balancer algorithm", Retrieved from: https://learn.microsoft.com/en-us/azure/load-balancer/concepts, Feb. 12, 2023, 2 Pages.
Cao, et al., "On the Performance Variation in Modern Storage Stacks", In Proceedings of 15th USENIX Conference on File and Storage Technologies, Feb. 27, 2017, pp. 1-15.
Cardwell, et al., "BBR Congestion Control", In IETF Draft draft-cardwell-iccrg-bbr-congestion-control-00, Jul. 2017, 38 Pages.
Dobrescu, et al., "Toward predictable performance in software packet-processing platforms", In Proceedings of 9th {USENIX} Symposium on Networked Systems Design and Implementation, Apr. 24, 2012, pp. 1-14.
Eisenbud, et al., "Maglev: A fast and reliable software network load balancer", In Proceedings of 13th USENIX Symposium on Networked Systems Design and Implementation, Mar. 16, 2016, 523-535.
El-Sayed, et al., "Temperature Management in Data Centers: Why Some (Might) Like It Hot", In Proceedings of 12th ACM Sigmetrics/Performance Joint International Conference on Measurement and Modeling of Computer Systems, Jun. 11, 2012, pp. 163-174.
Farley, et al., "More for your Money: Exploiting Performance Heterogeneity in Public Clouds", In Proceedings of 3rd ACM Symposium on Cloud Computing, Oct. 14, 2012, 14 Pages.
Flavel, et al., "FastRoute: A Scalable Load-Aware Anycast Routing Architecture for Modern CDNs", In Proceedings of USENIX Symposium on Networked Systems Design and Implementation, May 4, 2015, pp. 381-394.
Gandhi, et al., "Duet: Cloud Scale Load Balancing with Hardware and Software", In Proceedings of the ACM Conference on SIGCOMM, Aug. 17, 2014, pp. 27-38.
Ginzburg, et al., "Serverless isn't Serverless: Measuring and Exploiting Resource Variability on Cloud Faas Platforms", In Proceedings of the 6th International Workshop on Serverless Computing, Dec. 7, 2020, pp. 43-48.
Grandl, et al., "Multi-Resource Packing for Cluster Schedulers", In Proceedings of ACM SIGCOMM Computer Communication Review vol. 44, Issue 4, Aug. 17, 2014, pp. 455-466.
Kumar, et al., "Swift: Delay is Simple and Effective for Congestion Control in the Datacenter", In Proceedings of the Annual conference of the ACM Special Interest Group on Data Communication on the applications, technologies, architectures, and protocols for computer communication, Aug. 10, 2020, pp. 514-528.
Li, et al., "On Dynamic Bin Packing For Resource Allocation In The Cloud", In In Proceedings of the 26th ACM Symposium on Parallelism in Algorithms and Architectures, Jun. 21, 2014, pp. 2-11.
Lu, et al., "Predictive VM Consolidation on Multiple Resources: Beyond Load Balancing", In IEEE/ACM 21st International Symposium on Quality of Service, Jun. 3, 2013, 10 Pages.
Manousis, et al., "Contention-aware performance prediction for virtualized network functions", In Proceedings of the Annual conference of the ACM Special Interest Group on Data Communication on the applications, technologies, architectures, and protocols for computer communication, Aug. 10, 2020, pp. 270-282.
Mao, et al., "DRAPS: Dynamic and Resource-Aware Placement Scheme for Docker Containers in a Heterogeneous Cluster", In Proceedings of IEEE 36th International Performance Computing and Communications Conference, Dec. 10, 2017, 8 Pages.
Maricq, et al., "Taming Performance Variability", In Proceedings of the 12th USENIX conference on Operating Systems Design and Implementation, Oct. 8, 2018, pp. 409-425.
Meza, et al., "A Large-Scale Study of Flash Memory Failures in the Field", In Proceedings of the ACM SIGMETRICS International Conference on Measurement and Modeling of Computer Systems, Jun. 15, 2015, 14 Pages.
Miao, et al., "Silkroad: Making Stateful Layer-4 Load Balancing Fast and Cheap using Switching Asics", In Proceedings of the Conference of the ACM Special Interest Group on Data Communication, Aug. 21, 2017, pp. 15-28.
Mittal, et al., "TIMELY: RTT-based Congestion Control for the Datacenter", In Journal of ACM SIGCOMM Computer Communication Review, vol. 45, Issue 4, Aug. 17, 2015, pp. 537-550.
Olteanu, et al., "Stateless Datacenter Load-balancing with Beamer", In Proceedings of 15th USENIX Symposium on Networked Systems Design and Implementation, Apr. 9, 2018, pp. 125-139.
Patel, et al., "Ananta: Cloud Scale Load Balancing", In Proceedings of the ACM SIGCOMM Conference on SIGCOMM, Aug. 12, 2013, pp. 207-218.
Qin, et al., "Research on Nginx Dynamic Load Balancing Algorithm", In Proceedings of 12th International Conference on Measuring Technology and Mechatronics Automation, Feb. 28, 2020, pp. 620-624.
Sanders, Corey, "Introducing B-Series, our new burstable VM size", Retrieved from: https://azure.microsoft.com/en-us/blog/introducing-b-series-our-new-burstable-vm-size/, Sep. 11, 2017, 5 Pages.
Sharma, et al., "Resource Deflation: A New Approach For Transient Resource Reclamation", In Proceedings of the Fourteenth EuroSys Conference, Mar. 25, 2019, 17 Pages.
Shobhana, et al., "Load balancers need in-band feedback control", In Proceedings of the 21st ACM Workshop on Hot Topics in Networks, Nov. 14, 2022, pp. 76-84.
Subramanian, "Mise: Providing Performance Predictability and Improving Fairness in Shared main Memory Systems", In Proceedings of IEEE 19th International Symposium on High Performance Computer Architecture, Feb. 23, 2013, pp. 1-13.
Subramanian, et al., "The Application Slowdown Model: Quantifying And Controlling the Impact of Inter-Application Interference at Shared Caches and Main Memory", In Proceedings of the 48th International Symposium on Microarchitecture, Dec. 5, 2015, pp. 62-75.
Tootoonchian, et al., "Resq: Enabling slos in network function virtualization", In Proceedings of 15th USENIX Symposium on Networked Systems Design and Implementation, Apr. 9, 2018, pp. 283-297.

(56) References Cited

OTHER PUBLICATIONS

Uta, et al., "Is big data performance reproducible in modern cloud networks?", In Proceedings of the 17th USENIX Symposium on Networked Systems Design and Implementation, Feb. 25, 2020, pp. 513-527.
Venkataraman, et al., "Ernest: Efficient Performance Prediction for Large-Scale Advanced Analytics", In 13th USENIX Symposium on Networked Systems Design and Implementation, Mar. 16, 2016, pp. 363-378.
Wang, et al., "Smartharvest: Harvesting Idle Cpus Safely and Efficiently in the Cloud", In Proceedings of the Sixteenth European Conference on Computer Systems, Apr. 21, 2021, pp. 1-16.
Wang, et al., "What can we Learn from Four years of Data Center Hardware Failures?", In Proceedings of 47th Annual IEEE/IFIP International Conference on Dependable Systems and Networks, Jun. 26, 2017, pp. 1-12.
Xu, et al., "dCat: Dynamic Cache Management for Efficient, Performance-sensitive Infrastructure-as-a-Service", In Proceedings of the Thirteenth EuroSys Conference, Apr. 23, 2018, 13 Pages.
Yadwadkar, et al., "Selecting the Best VM Across Multiple Public Clouds: A Data-Driven Performance Modeling Approach", In Proceedings of the Symposium on Cloud Computing, Sep. 24, 2017, pp. 452-465.

\* cited by examiner (a) Direct Server Return (DSR) Mode (b) Proxy Mode

CAPACITY AWARE LOAD PACKING FOR LAYER-4 LOAD BALANCER

BACKGROUND

A layer-4 load balancer (L4 LB) is one of the key building blocks of online services. Individual services expose small number of virtual IPs (called VIPs) to receive traffic from outside services. Internally, the services scale by running on multiple backend instances of servers with unique direct IPs (backend instances are hereinafter called DIPs). The LB receives traffic coming on the VIPs and distributes it across the DIPs.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes obtaining a latency measurement for each direct IP (DIP) of a plurality of DIPs in a virtual network, wherein the latency measurement provides an indication of a capacity for each DIP. The method includes using an integer linear program (ILP) to calculate a weight for each DIP using the latency measurement. The method includes providing, to a layer-4 load balancer, the weight for each DIP, wherein the weight identifies an amount of traffic to provide to each DIP.

Some implementations relate to a device. The device includes a processor; memory in electronic communication with the processor; and instructions stored in the memory, the instructions being executable by the processor to: obtain a latency measurement for each direct IP (DIP) of a plurality of DIPs in a virtual network, wherein the latency measurement provides an indication of a capacity for each DIP; use an integer linear program (ILP) to calculate a weight for each DIP using the latency measurement; and provide, to a layer-4 load balancer, the weight for each DIP, wherein the weight identifies an amount of traffic to provide to each DIP.

Some implementations relate to a method. The method includes using latency measurements to determine a first subset of weights for each direct IP (DIP) of a plurality of DIPs in a virtual network. The method includes obtaining a latency measurement for the first subset of weights for each DIP. The method includes generating a latency weight curve for each DIP using the latency measurement for the first subset of weights. The method includes using an integer linear program (ILP) to compute a first weight for each DIP using the latencies and weights from the latency weight curve for each DIP as input to the ILP, wherein the first weight is an estimation of a weight for each DIP. The method includes using the first weight for each DIP to determine a second subset of weights for each DIP. The method includes obtaining the latency measurement for the second subset of weights for each DIP. The method includes generating a second latency weight curve for each DIP using the latency measurement for the second subset of weights. The method includes using the ILP to compute a second weight for each DIP using the latencies and the weights from the second latency weight curve for each DIP as input to the ILP. The method includes providing the second weight for each DIP to a load balancer controller, wherein the second weight identifies an amount of traffic to provide to each DIP.

Some implementations relate to a device. The device includes a processor; memory in electronic communication with the processor; and instructions stored in the memory, the instructions being executable by the processor to: use latency measurements to determine a first subset of weights for each direct IP (DIP) of a plurality of DIPs in a virtual network; obtain a latency measurement for the first subset of weights for each DIP; generate a latency weight curve for each DIP using the latency measurement for the first subset of weights; use an integer linear program (ILP) to compute a first weight for each DIP using the latencies and weights from the latency weight curve for each DIP as input to the ILP, wherein the first weight is an estimation of a weight for each DIP; use the first weight for each DIP to determine a second subset of weights for each DIP; obtain the latency measurement for the second subset of weights for each DIP; generate a second latency weight curve for each DIP using the latency measurement for the second subset of weights; use the ILP to compute a second weight for each DIP using the latencies and the weights from the second latency weight curve for each DIP as input to the ILP; and provide the second weight for each DIP to a load balancer controller, wherein the second weight identifies an amount of traffic to provide to each DIP.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

A layer-4 load balancer (L4 LB) is one of the key building blocks of online services. Individual services expose small number of virtual IPs (called VIPs) to receive traffic from outside services. Internally, the services scale by running on multiple backend instances of servers with unique direct IPs (backend instances are hereinafter called DIPs). The LB receives traffic coming for the VIPs and distributes it across the DIPs.

An online service deploys multiple servers with DIPs, primarily to scale and to provide high availability. The DIPs run behind a load-balancer (LB) that exposes one or more virtual IP (VIP) to receive the traffic from outside the service. The L4 LB splits the traffic across DIPs using TCP/IP fields. VIPs offer multiple benefits for scalability, security and high availability.

Figure 1A:
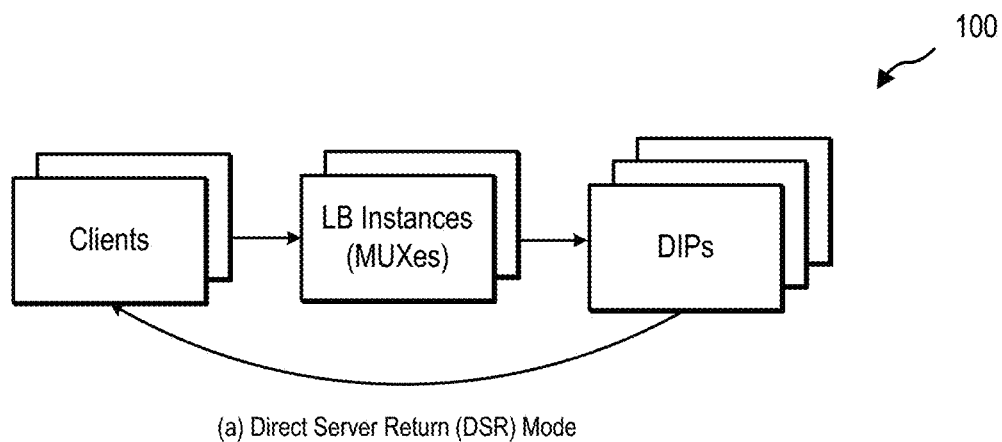
FIG. 1A illustrates an example of an existing layer-4 load balancer system with Direct Server Return (DSR).

FIG. 1A illustrates an example of an existing layer-4 load balancer system (L4 LB) 100 with Direct Server Return (DSR). The L4 LB system 100 runs on multiple instances (called MUXes). MUXes intercept the VIP traffic from the clients. Most of the public cloud providers use IP-in-IP encapsulation to route the VIP packets to DIPs. The packets in the reverse direction use Direct Server Return (DSR) bypassing MUXes.

Figure 1B:
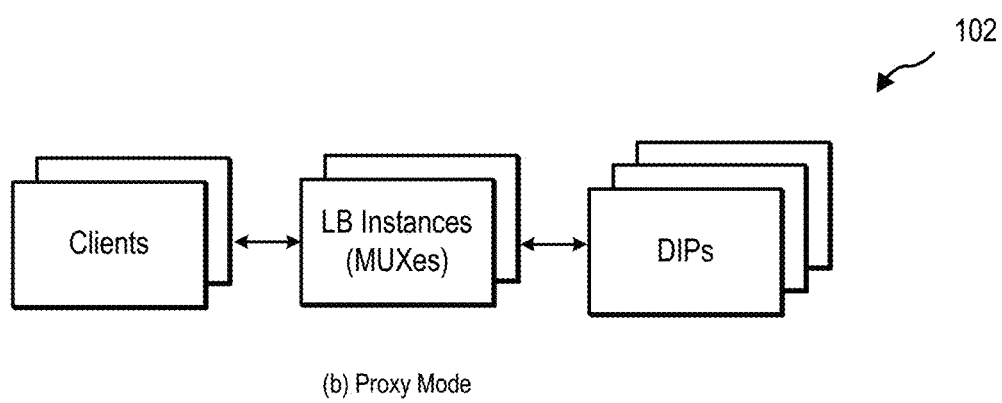
FIG. 1B illustrates an example of an existing proxy mode system for a layer-4 load balancer.

FIG. 1B illustrates an example of an existing proxy mode system 102 for a L4 LB. Most of the third party designs for a L4 LB use a proxy mode where there are TCP connections between clients-MUXes and corresponding connections between MUXes-DIPs. The MUXes simply copy traffic between such connections. The MUXes select the DIPs for new connections using different algorithms, such as round robin, hash over TCP/IP fields, or least connections, and focus on processing packets with high throughput and low latency.

Existing solutions for L4 LB typically assume that capacities of the DIPs are uniform and/or static when balancing the incoming traffic across the DIPs. However, at best, such an assumption is restrictive, and at worst, it breaks down (especially in virtualized clusters). In virtualized clusters capacity of the DIPs can dynamically change. One reason for the dynamic capacity of the DIPs is noisy neighbors. VMs on the same host compete for shared resources, such as, caches and memory bus, resulting in capacity variations. Additionally, customers can have DIPs of vastly different capacities in the DIP-pool.

In addition, dynamic over-subscription in terms of physical CPU cores, i.e., the number of vCPUs sharing the same physical cores changes dynamically depending on customer demand, can also result in changes in capacities of the DIPs. Reassignments of VMs to different parts of a service (e.g., service owners do not release VMs when not in use, but instead, reassign the VMs to parts of the service) also results in DIPs behind the same VIP with different capacities. Online services also use DIPs from different generations and SKU resulting in DIPs with different capacities.

Existing solutions use multiple load-balancing algorithms including round-robin, hash-based and least connection algorithms. However, existing solutions are unable to adapt to different or dynamic capacities of the DIPs. Existing solutions do not load balance in accordance with capacities of the DIPs causing an imbalance in CPU utilization and the latencies for requests going to the over-utilized DIPs to increase.

The methods and systems of the present disclosure balance the load of the incoming traffic for the VIPs as per capacities of the DIPs. A capacity of a DIP is the maximum throughput (e.g., requests/sec) provided by the DIP before at least one resource (e.g., CPU) becomes the bottleneck.

The methods and systems of the present disclosure model load balancing as a "bin packing" problem that takes weight and latency mapping as an input and populates such mapping intelligently and quickly using algorithms coupled with logical regression. The methods and systems use latency as a signal to solve the packing problem and adjust the weights based on the latency. The methods and systems specify the weights for splitting the traffic across the DIPs.

The methods and systems decouple the weight calculations from individual LB instances and calculates the weights at a central controller. Benefits of calculating the weights at a central controller include: (a) freeing up the LB dataplane from weight calculations and helping the LB dataplane perform highly by providing low latency, high throughput packet processing, and (b) helping implement more informed designs for weight calculation at the central controller.

In some implementations, the methods and systems use an Integer Linear Program (ILP) to calculate the LB weights to minimize the total end-to-end latency across DIPs of a VIP. In some implementations, the methods and systems speed up building the mapping between weights and latency for individual DIPs by taking latency measurement at small number of weights and use curve-fitting to estimate the latency for other weights. In some implementations, the methods and systems hop different weights to reduce number of latency measurements and get rough estimate of capacity of DIPs. In some implementations, the methods and systems use a multi-step ILP to substantially speed up weight calculation. The methods and systems adapt to changes in the cluster such as capacity changes, traffic changes and DIP failures.

One technical advantage of the methods and systems of the present disclosure is load balancing the traffic as per the capacities of the DIPs resulting in low overall latency and less unused capacity. Another technical advantage of the methods and systems of the present disclosure is minimizing the total latency for the traffic across all DIPs of a VIP. Another technical advantage of the methods and systems of the present disclosure is the ability to quickly calculate the load per backend instances.

Another technical advantage of the methods and systems of the present disclosure is that the methods and systems do not require any apriori knowledge about the capacities of the backend instances. In addition, the methods and systems do not require any agents running on the MUXes, DIPs, or clients. The methods and systems do not have access to DIP SKU, CPU or any counters. The methods and systems receive the IP address of the DIPs and intelligently gathers information using the algorithms online without requiring any offline profiling.

Another technical advantage of the methods and systems of the present disclosure is versatility. The methods and systems of the present disclosure may work with any existing layer-4 LB. The methods and systems compliment the availability, scalability, and cost benefits of the existing LB designs with weight calculations as per the capacities of the DIPs, empowering other LBs to be capacity aware. The present disclosure includes several practical applications that provide benefits and/or solve problems associated with load balancing traffic for the VIPs.

Figure 2:
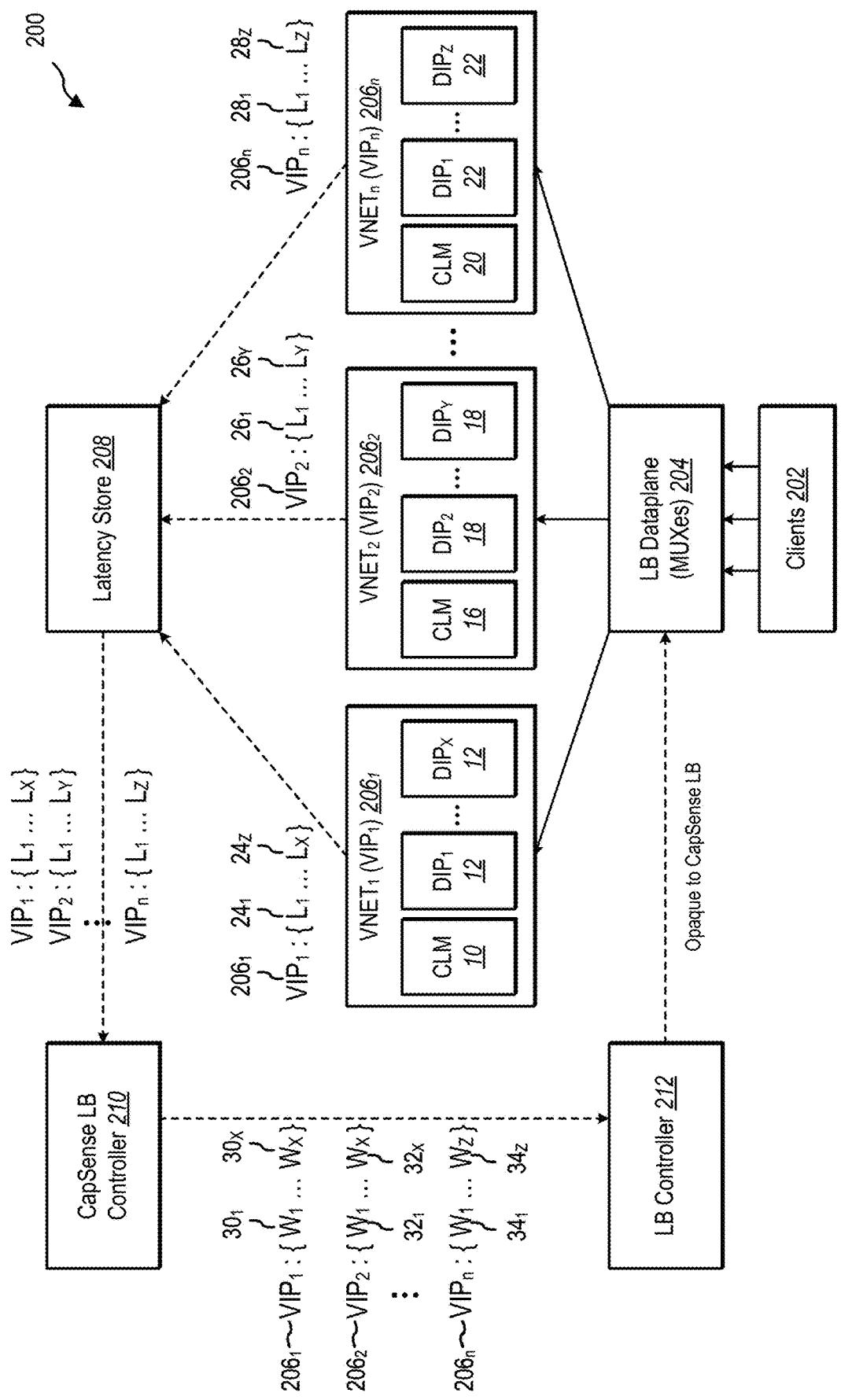
FIG. 2 illustrates an example environment for a capacity aware layer-4 load balancer system in accordance with implementations of the present disclosure.

Referring now to FIG. 2, illustrated is an example environment 200 for a capacity aware layer-4 load balancer (L4 LB). The environment 200 includes a plurality of clients 202 sending requests (traffic) for online services up to n (where n is a positive integer) online services. Examples of online services include search engines, e-mail services, video calling, retail services, health services, etc. Each service exposes a VIP 206 to receive traffic from outside the service (the traffic from the clients 202). For example, the $VIP_1$ $206_1$ supports a search engine service and the $VIP_2$ $206_2$ supports an e-mail service.

The services scale by running on multiple backend servers with unique direct IPs (DIPs). One example is an online service using 100,000 servers (DIPs) to support the service provided by the online service. The $VIP_1$ $206_1$ includes a plurality of DIPs 12 up to x, where x is a positive integer. The $VIP_2$ $206_2$ includes a plurality of DIPs 18 up to y, where y is a positive integer. The environment 200 includes up to n VIPs supporting the different online services. For example, the $VIP_n$ $206_n$ includes a plurality of DIPs 22 up to z, where z is a positive integer. The requests from the clients 202 are received by a LB dataplane 204 and provided to the VIP 206 of the supported service for the request.

The environment 200 includes a capsense LB controller 210 that calculates weights for each DIP 12, 18, 22 at a central controller by evaluating the latency measurements of each DIPs 12, 18, 22. The latency measurements are used by the capsense LB controller 210 to estimate a capacity of each DIP 12, 18, 22. The weights are used to determine an amount of traffic to provide to each DIP 12, 18, 22 based on a capacity of each DIP 12, 18, 22.

A capsense latency measurement (CLM) component 10, 16, 20 resides in each VNET. The CLM component 10, 16, 20 periodically measures the latency for requests from each DIP 12, 18, 22. For example, the CLM component 10 is in $VNET_1$ and measures the latency 24 for each DIP 12 (e.g., $DIP_1$ 12 to $DIP_x$ 12) in $VNET_1$. The CLM component 16 is in $VNET_2$ and measures the latency 26 for each DIP 18 (e.g., $DIP_1$ 18 to $DIP_y$ 18) in $VNET_2$. The $VNET_n$ includes the CLM component 20 that measures the latency 28 for each DIP 22 (e.g., $DIP_1$ 22 to $DIP_z$ 22) in $VNET_n$.

The latency 24, 26, 28 is measured for applications based on the uniform resource locator (URL) provided by the users. In some implementations, the CLM component 10, 16, 20 measures latency every 5 seconds using the application URL provided by the users. The requests are sent directly to the DIPs 12, 18, 22 (using IP of a DIP and not VIP) without going through MUXes so that the CLM component 10, 16, 20 identifies the DIP 12, 18, 22 and eliminates the interference of the MUXes.

The latency 24, 26, 28 measurements are stored in a latency store 208. In some implementations, the latency 24, 26, 28 measurements are stored with the VIP 206 as the key and the value is a list of <DIP, latency, time> tuples.

A capsense LB controller 210 reads the latencies 24, 26, 28 from the latency store 208 and calculates the weights 30, 32, 34 for the DIPs 12, 18, 22. The capsense LB controller 210 uses the latencies 24, 26, 28 to calculates the weights as per the capacities of the DIPs 12, 18, 22. In some implementations, the latencies 24, 26, 28 provide an estimation of the capacity of the DIPs 12, 18, 22. The capsense LB controller 210 uses the capacities to program the weights 30, 32, 34 for the DIPs 12, 18, 22 to minimize the total latency across all DIPs 12, 18, 22 of a VIP 206.

In some implementations, the capsense LB controller 210 includes an Integer Linear Program (ILP) module that calculates optimal weights 30, 32, 34 for the DIPs 12, 18, 22. The capsense LB controller 210 computes the weights 30, 32, 34 using an ILP to minimize the total latency. The capsense LB controller 210 runs the ILP for each VIP 206. The ILP packs the load per capacities of the DIPs 12, 18, 22. An example equation the capsense LB controller 210 uses for the ILP is illustrated below in equation (1):

$$\sum_{d \in D} \sum_{w \in W_d} X_{d,w} \cdot l_{d,w} \quad (1)$$

where D is the set of DIPs (e.g., $DIP_1$ 12 to $DIP_x$ 12), w is the weight between [0,1], $W_d$ is the set of weights for the d-th DIP, $l_{d,w}$ is the latency on the d-th DIP for the w-th weight, and $Y_{max}$, $Y_{min}$ is the maximum and minimum weights across the DIPs. The ILP variable is $X_{d,w}$ (Boolean) indicating if the w-th weight is assigned to the d-th DIP. The $l_{d,w}$ indicates the latency for the d-th DIP for w-th weight to be provided before running the ILP equation (1).

In some implementations, the following constraints are the following constraints are applied to equation (1).

$$\forall d \in D, \sum_{w \in W_d} X_{d,w} = 1 \quad (2)$$

$$\sum_{d \in D} \sum_{w \in W_d} X_{d,w} \cdot w = 1 \quad (3)$$

$$y_{max} - y_{min} \le \theta \quad (4)$$

$$\forall d \in D, y_{max} \ge \sum_{w \in W_d} X_{d,w} \cdot w, y_{min} \le \sum_{w \in W_d} X_{d,w} \cdot w \quad (5)$$

In the constraint (2), the capsense LB controller 210 assigns only one weight to each DIP. In the constraint (3), the sum of total weight assigned across all DIPs is 1. In the constraint (4), the imbalance is restricted to θ. The capsense LB controller 210 does not load balance equally, and instead, calculates the weights so as to minimize total latency. Constraint specifies $y_{max}$ and $y_{min}$ as the maximum and minimum weights across all DIPs. The capsense LB controller 210 uses the ILP equation (1) to model load balancing as load packing and packs the load based on the capacities of the DIPs 12, 18, 22 to minimize the total latency.

Calculating the values of $l_{d,w}$ for each DIP for use as the input to the ILP equation (1) may be a time consuming process. In some implementations, the capsense LB controller 210 includes a calculate weights for latency measurement module that determines a subset of the weights (e.g., a small number of weights) for latency measurement. In some implementations, the capsense LB controller 210 uses a subset of the latency measurements to get the values of $l_{d,w}$ for the input to the ILP equation (1). The capsense LB controller 210 makes the latency measurements for small number of weights and uses curve fitting (x-axis=weight, y-axis=latency) using polynomial regression to build a latency weight curve. The capsense LB controller 210 uses the latency weight curve to estimate the latency for other values of weights where the capsense LB controller 210 did not make latency measurements directly.

In some implementations, the calculate weights for latency measurement module in the capsense LB controller 210 includes rough estimates of the DIP capacity in terms of weight. The capsense LB controller 210 uses the weight estimates in building the latency weight curve.

In some implementations, capsense LB controller 210 uses Algorithm 1 to calculate the weight for each DIP (e.g., $DIP_1$ 12 to $DIP_x$ 12) in each iteration in the measurement phase.

---
Algorithm 1
---

INPUT: $l_0, l_w, w_{now}, w_{max}^{prev}$
OUTPUT: $w_{next}, w_{max}$, isExplorationDone
1: if $w_{now} - w_{prev} \leq D$ then
2:     isExplorationDone ← 1; return
3: end if
4: if ! (packet drop) then
5:     $w_{max} = \max(w_{max}^{prev}, w_{now})$ 6:     $w_{next} \leftarrow w_{now} + w_{now} \cdot \alpha \cdot \dfrac{l_0}{l_w}$     ▷ Run phase 7: else 8:     $w_{next} \leftarrow \dfrac{w_{now} + w_{max}}{2}$     ▷ Backtrack phase 9: end if

---

The input to Algorithm 1 includes $w_{now}$ and $w_{prev}$, the weights for current and previous iterations. $w_{max}$ indicates the maximum weight observed so far without packet drop. The input also includes $l_0$ and $l_{now}$, the latencies when weight was 0 and latency for current weight. The capsense LB controller 210 measures $l_0$ when the DIP is newly added by setting weight to 0. The output includes $w_{next}$ as the weight for the next iteration. It also includes isExplorationDone, a boolean indicating if the computation to get latency weight map is done. For such a DIP (with this flag set), the ILP assigns weights, else calculate $w_{next}$.

As noted on lines 1-2 of Algorithm 1, if the difference between $w_{now}$ and $w_{prev}$ is small, the isExplorationDone flag is set. When there is no packet drop, the Algorithm 1 indicates that there is still some capacity remaining and the capsense LB controller 210 can increase weight. The $w_{max}$ (line 5) is updated and the weight is increased proportional to latency (line 6 of Algorithm 1). When $l_w$ is comparable to $l_0$, the Algorithm 1 indicates there is more capacity left, and a bigger increase in $w_{next}$ can occur. When $l_w$ is considerably higher than $l_0$, the Algorithm 1 indicates the capacity is being reached, and the increase in $w_{next}$ is slowed down. $\alpha$ indicates the pace of increase (set to 1). When there is a packet drop (capacity is reached), and the $w_{next}$ is reduced to the average of $w_{now}$ and $w_{max}$ (line 8 of Algorithm 1). Lastly, to improve the exploration time, a packet drop is flagged when $l_w$ is 5 times $l_0$ based on the observation that latencies are 5 times $l_0$ or higher when the CPU is 100% utilized.

The capsense LB controller 210 uses the weight estimates from Algorithm 1 in building the latency weight curve to get the values of $l_{d,w}$ for the input to the ILP equation (1). In some implementations, the capsense LB controller 210 runs the ILP equation (1) using the latency weight curve in two steps, instead of one step. Running the ILP algorithm in two steps improves the ILP running time while maintaining the accuracy of the ILP algorithm.

For example, instead of running ILP with 100 weights for every DIP, the capsense LB controller 210 in the first step, only provides 10 values uniformly between 0 and $w_{max}$ (instead of between 0-1). This provides the course estimate for the weights without packet drop. In the second step, the capsense LB controller 210 calculates the weights more precisely. If $w_d$ is weight for d-th DIP in first step, the capsense LB controller 210 provides 10 values uniformly between $w_d$ $\delta$ to $w_d+\delta(\delta=10\%$ of $w_{max})$. For example, the capsense LB controller 210 does multi-step iterations when the number of DIPs is 100. For rest, the capsense LB controller 210 performs the first step.

The capsense LB controller 210 sends the weights 30, 32, 34 to the LB controller 212, which in turn programs the MUXes with the new weights 30, 32, 34. In some implementations, the MUXes run the WRR (weighted round robin) using the weights 30, 32, 34 sent by the LB controller 212.

In some implementations, the capsense LB controller 210 includes a scheduler module that schedules the weights 30, 32, 34 in multiple rounds to send to the LB controller 212. For example, the scheduler module schedules the weights 30, 32, 34 in multiple rounds in response to the weights 30, 32, 34, exceeding a total weight of 1. Another example includes the scheduler module prioritizing certain latency measurements over other latency measurements.

In some implementations, the scheduler module of the capsense LB controller 210 classifies the DIPs 12, 18, 22 with new weights 30, 32, 34 to be scheduled into 3 priority classes: (1) a priority class for the weights for over-utilized DIPs, (2) a priority class for the weights for remaining DIPs, and (3) a priority class for the weights during refresh. Within a priority class, the scheduler module uses first in, first out (FIFO). To schedule the DIPs with new weights, the scheduler module uses a simple greedy algorithm that arranges all DIPs as per their priority and hops over the DIPs one by one until: (1) the weight of DIPs scheduled is 1, or (2) the algorithm hops over all DIPs.

It can happen that the total weight for the scheduled DIPs is less than 1 (especially in (2)). In such a case, the scheduler module calculates the remaining weights for DIPs as: the weight scheduled is $w_s$. Thus, the scheduler module assigns $1-w_s$ using the remaining DIPs. For the DIPs that are classified, the scheduler module uses the ILP with a modified constraint where the total weight is $1-w_s$. In cases where ILP returns an unsatisfactory assignment, the scheduler module splits remaining weight $(1-w_s)$ equally across all remaining DIPs.

In some implementations, the capsense LB controller 210 quickly reacts to changing dynamics of the environment 200. Changing dynamics include traffic changes, failures, and/or capacity changes.

One example use case includes when the total traffic increases (e.g., increase in requests from the clients 202), the traffic volume going to the DIPs 12, 18, 22 will increase for the same weights 30, 32, 34, resulting in higher latency for the same weights 30, 32, 34. When the traffic increases, the capsense LB controller 210 detects the change using the latency 24, 26, 28 measurements provided and updates the latency weight curve. For example, the latency was 5 msec at weight 0.5 ($w_1$). With increased traffic, now the latency has increased to 7 msec for the same weight and the weight ($w_2$) for latency of 7 msec is 0.625. To calculate new weight, the capsense LB controller 210 multiplies the existing weights by $\delta$, where $\delta=w1/w2$. The capsense LB controller 210 multiplies all the weights with $\delta$. Similarly, when the traffic has reduced, the capsense LB controller 210 increases the weights for the same latency values using above mechanism. The capsense LB controller 210 may periodically refresh the weight-latency curve to fix any drift based on the traffic changes.

Another example use case includes the capacity of the DIPs changes dynamically (e.g., change in co-located VMs). The capsense LB controller 210 updates the latency-weight curve in response to the capacity changing for such DIPs. The capsense LB controller 210 detects capacity has changed if the observed latency differs from the estimated latency by more than a threshold (O set to +/−20% of $l_{d,w}$). The capsense LB controller 210 adjusts the weights as detailed above (e.g., if the latency has changed from 5 msec to 7 msec, the capsense LB controller 210 uses the $w_1$ and $w_2$ from the above example.

Another example use case includes the capsense LB controller 210 detecting DIP failures or unreachability when the capsense LB controller 210 is unable to receive successful results for the pings (e.g., pings for latency). In such cases, the capsense LB controller 210 removes the DIP from the ILP calculation. Because ILP has the $l_{d,w}$ readily available for all DIPs, the capsense LB controller 210 recalculates the weights without failed DIPs and sends those weights to the LB controller 212.

Another example use case includes the capsense LB controller 210 periodically refreshing the latency weight curve. For example, the capsense LB controller 210 limits the number of DIPs under refresh to 5% of total capacity. To refresh the latency, the LB controller 210 measures the latency for the weights using the Algorithm 1.

After the capsense LB controller 210 recalculates the weights for the latency measurement in response to changes in the environment 200, the capsense LB controller 210 sends the new weights to the LB controller 212 to program the new weights in the LB dataplane 204. There may be a delay in measuring the latency of the new weights. Delays may occur from the LB controller 212 (it takes time to program the dataplane 204). Also, once the LB dataplane 204 is programmed with the new weights, only the new connections adhere to the new weights. The old connections continue to use old weights. As a result, the capsense LB controller 210 waits until old connections finish to perform the latency measurements. As the capsense LB controller 210 does not run in the LB dataplane 204, the capsense LB controller 210 does not know whether all the old connections are finished or not.

In some implementations, the capsense LB controller 210 calculates the time between setting the weight and the latency measurement (called drain time) by using extreme settings for a DIP. First, the capsense LB controller 210 sets the weights high enough that the latency is high (time $T_1$). Then, the capsense LB controller 210 sets the weight to 0 so that no new connections go to this DIP. The capsense LB controller 210 continually measures the latency until it reaches $l_0$ (time $T_2$). The capsense LB controller 210 calculates the drain time as $T_2-T_1$.

The capsense LB controller 210 load balances the traffic as per the capacities of the DIPs 12, 18, 22, resulting in low overall latency and less unused capacity in the DIPs 12, 18, 22. By calculating the weights 30, 32, 34 at a central controller (the capsense LB controller 210), allows the LB dataplane 204 to focus on packet processing with low latency and high throughput.

In some implementations, one or more computing devices (e.g., servers and/or devices) are used to perform the processing of the environment 200. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the latency store 208, the capsense LB controller 210, and the LB controller 212 are implemented wholly on the same computing device. Another example includes one or more subcomponents of the latency store 208, the capsense LB controller 210, and/or the LB controller 212 are implemented across multiple computing devices. Moreover, in some implementations, one or more subcomponent of the latency store 208, the capsense LB controller 210, and/or the LB controller 212 may be implemented are processed on different server devices of the same or different cloud computing networks.

In some implementations, each of the components of the environment 200 is in communication with each other using any suitable communication technologies. In addition, while the components of the environment 200 are shown to be separate, any of the components or subcomponents may be combined into fewer components, such as into a single component, or divided into more components as may serve a particular implementation. In some implementations, the components of the environment 200 include hardware, software, or both. For example, the components of the environment 200 may include one or more instructions stored on a computer-readable storage medium and executable by processors of one or more computing devices. The processors may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. Memory is in electronic communication with the processors. The memory may be any electronic component capable of storing electronic information. For example, the memory may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof. When executed by the one or more processors, the computer-executable instructions of one or more computing devices can perform one or more methods described herein. In some implementations, the components of the environment 200 include hardware, such as a special purpose processing device to perform a certain function or group of functions. In some implementations, the components of the environment 200 include a combination of computer-executable instructions and hardware.

Figure 3:
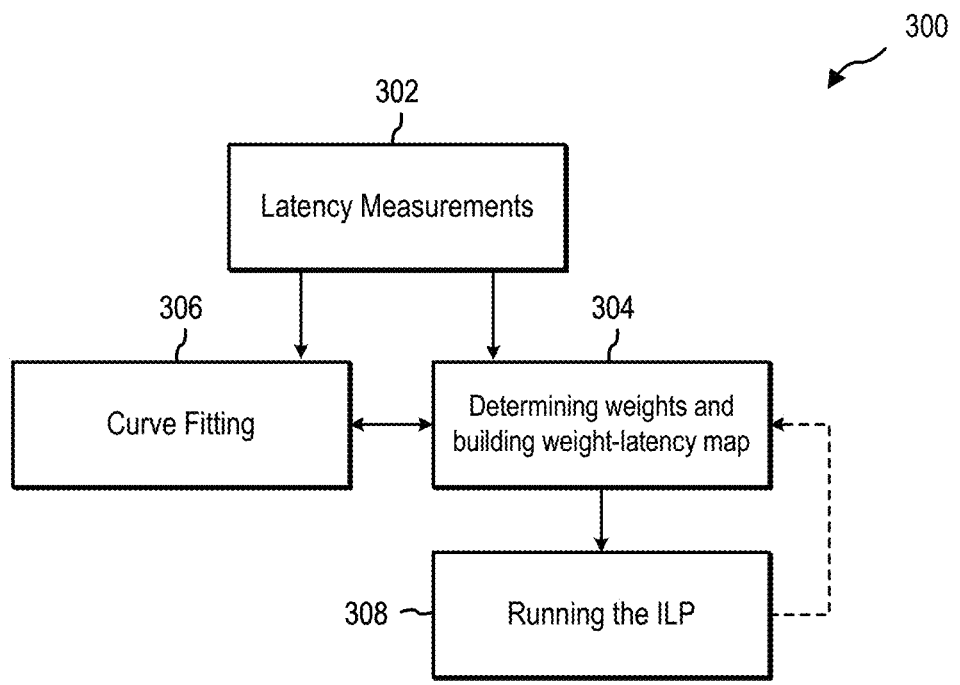
FIG. 3 illustrates an example method for using an Integer Linear Program (ILP) for calculating the weights for DIPs in accordance with implementations of the present disclosure.

Referring now to FIG. 3, illustrated is an example method 300 for using an ILP for calculating the weights for DIPs. The actions of the method 300 are discussed below with reference to FIG. 2.

At 302, the method 300 includes obtaining latency measurements for all DIPs of a VIP. In some implementations, the CLM (e.g., the CLM component 10) on a VIP (e.g., $VIP_1$ 206$_1$) periodically measures the latency 26 for each DIP of the VIP (e.g., $DIP_1$ 12 to $DIP_x$ 12 in $VIP_1$ 206$_1$). The latency measurements (e.g., the latency 24) are stored in a latency store 208. A capsense LB controller 210 reads the latency measurements (e.g., the latency 24) from the latency store 208.

At 304, the method 300 includes using the latency measurements to determine the weights for the ILP and building a weight latency map. In some implementations, the capsense LB controller 210 identifies a maximum weight for each DIP (e.g., $DIP_1$ 12 to $DIP_x$ 12 in $VIP_1$ $206_1$). The maximum weight is the observed weight for which there is no packet drop for each DIP. Different DIPs may have different capacities and may have a different maximum weight. For example, a maximum weight for $DIP_1$ 12 is 0.6 and a maximum weight for $DIP_2$ 12 is 0.8. In some implementations, the capsense LB controller 210 uses Algorithm 1 to calculate the maximum weight for each DIP.

The capsense LB controller 210 determines a subset of weights up to the maximum weight for each DIP. For example, the capsense LB controller 210 determines a subset of 10 uniform weights from 0 to the maximum weight for each DIP. The capsense LB controller 210 uses the subset of weights to build the weight latency map to provide as input to the ILP.

At 306, the method 300 includes using curve fitting to get the latency for the weights for the ILP. The latency curve is used to build the weight latency map ($l\_\{d,w\}$) to provide as the input to the IPL. The capsense LB controller 210 obtains the latency measurement for the subset of weights and uses curve fitting using polynomial regression to build a latency weight curve to estimate latency measurements for other values of weights where the capsense LB controller 210 did not make the latency measurements directly.

At 308, the method 300 includes running the ILP with the weight latency map. The capsense LB controller 210 uses the latency weight curve as the input ($l\_\{d,w\}$) to the ILP equation (1) to calculate the weights for the DIPs. The output of the ILP equation (1) after the first pass provides a single weight to assign to the DIPs. For example, the single weight is an estimation of weight to assign to the DIP based on the capacity. In some implementations, the capsense LB controller 210 provides the weights for each DIP to the LB controller 212 to program the LB dataplane 204 with the weights for each DIPs.

In some implementations, the method 300 returns to 304 to determine a second set of weights for the ILP using the first weights provided during the first pass of the ILP at 308. The capsense LB controller 210 uses the first weights to determine a second subset of weights for each DIP. The capsense LB controller 210 determines a second subset of weights for each DIP. The second subset of weights are within a range of the first weight (e.g., the estimation of weight). The range includes a portion of weights above the estimation of weight and a portion of weights below the estimation of weight. One example of the range includes 10% of weights above the estimation of weight and 10% of weights below the estimation of weight. For example, if W is the first weight output from the ILP, the second subset of weights include 0.9*W to 1.1*W. The capsense LB controller 210 uses the second subset of weights to build the weight latency map to provide as input to the ILP for a second pass.

The method 300 returns to 306 and uses curve fitting to get the latency for the second set of weights. The second latency curve is used to build a second weight latency map ($l\_\{d,w\}$) to provide as the input to the IPL for a second pass. The capsense LB controller 210 obtains the latency measurement for the second subset of weights from the latency store 208 and uses curve fitting using polynomial regression to build a second latency weight curve to estimate latency measurements for other values of weights where the capsense LB controller 210 did not make the latency measurements directly.

The method 300 returns to 308 and runs a second pass of the ILP with the second weight latency map. The capsense LB controller 210 uses the second latency weight curve as the input ($l\_\{d,w\}$) to the ILP equation (1) to calculate the weights for the DIPs. The output of the ILP equation (1) is a weight for each DIP of a VIP (e.g., $W_1$ $30_1$ to $W_x$ $30_x$ for $DIP_1$ 12 to $DIP_x$ 12). The weight provided from the second output of the IPL equation (1) may be more precise than the estimation provided from the first output of IPL equation (1). Running the ILP algorithm in two steps improves the ILP running time while maintaining the accuracy of the ILP algorithm.

The capsense LB controller 210 sends the weight for each DIP to the LB controller 212, which in turn programs the MUXes with the new weights (e.g., $W_1$ $30_1$ to $W_x$ $30_x$ for $DIP_1$ 12 to $DIP_x$ 12).

The method 300 may repeat for each VIP (e.g., $VIP_2$ $206_2$ up to $VIP_n$ $206_n$) so that the weights are calculated for each DIP in each VIP (e.g., $DIP_2$ 18 to $DIP_y$ 18 in $VIP_2$ $206_2$ up to $DIP_1$ 22 to $DIP_z$ 22 in $VIP_n$ $206_n$).

Figure 4:
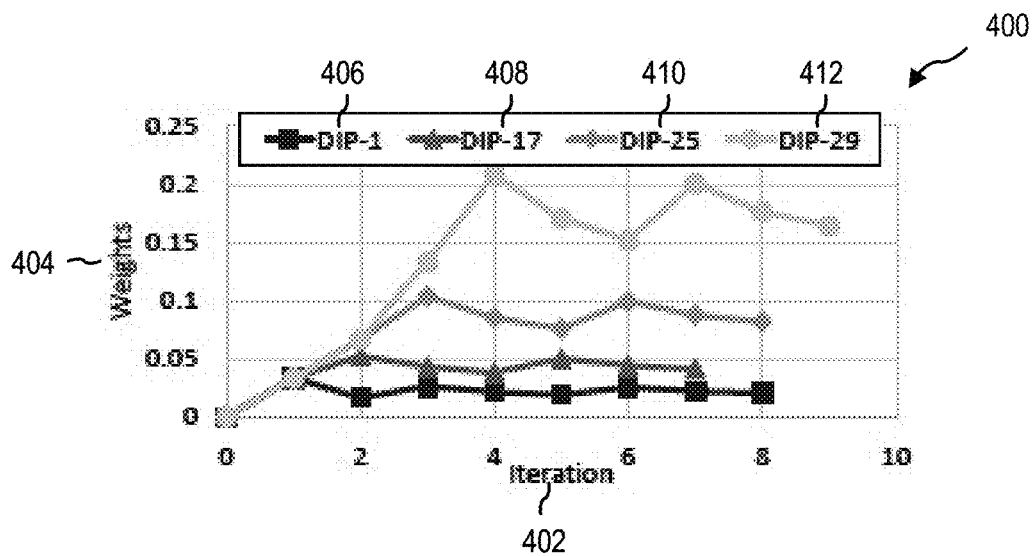
FIG. 4 illustrates an example graph of weights used for latency measurements in accordance with implementations of the present disclosure.

FIG. 4 illustrates an example graph 400 of the weights used for latency measurements. The graph 400 has the number of iterations on the x-axis 402 and the weights on the y-axis 404. The graph 400 shows the weights (e.g., the different shapes on the different lines) calculated for four different DIPs in the VNET (DIP-1 406, DIP-17 408, DIP-25 410, DIP-29 412). For example, the capsense LB controller 210 (FIG. 2) uses the Algorithm 1 to calculate the maximum weights plotted in the graph 400 for the four different DIPs (DIP-1 406, DIP-17 408, DIP-25 410, DIP-29 412). The graph 400 illustrates that the weights calculated by the capsense LB controller 210 vary across the different DIPs (DIP-1 406, DIP-17 408, DIP-25 410, DIP-29 412).

Figure 5:
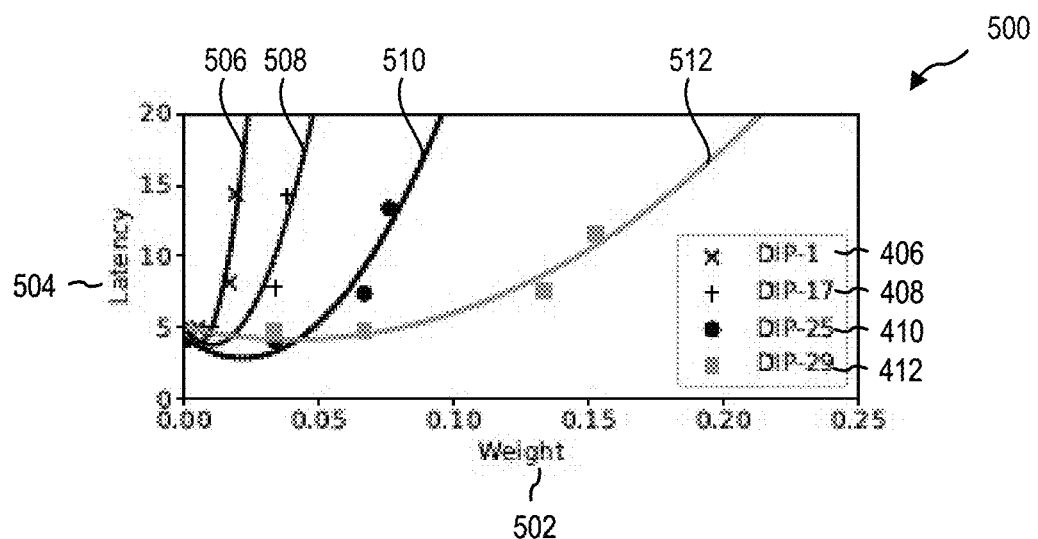
FIG. 5 illustrates an example graph of a latency weight curve in accordance with implementations of the present disclosure.

FIG. 5 illustrates an example graph 500 of a latency weight curve in accordance with implementations of the present disclosure. The graph 500 has the weight on the x-axis 502 and the latency on the y-axis 504. The weights illustrated on the x-axis correspond to the weights from the graph 400. The graph 500 uses a polynomial regression to fit the latency weight curve (e.g., the latency weight curves 506, 508, 510, 512) to estimate the latencies not used in the measurement. For example, the capsense LB controller 210 (FIG. 2) uses the weights from the graph 400 to calculate a small number of latency measurements (e.g., 5 latency measurements) for the different DIPs (DIP-1 406, DIP-17 408, DIP-25 410, DIP-29 412). The capsense LB controller 210 uses a polynomial regression to fit the curve to estimate the latencies for the different DIPs (DIP-1 406, DIP-17 408, DIP-25 410, DIP-29 412).

Figure 6:
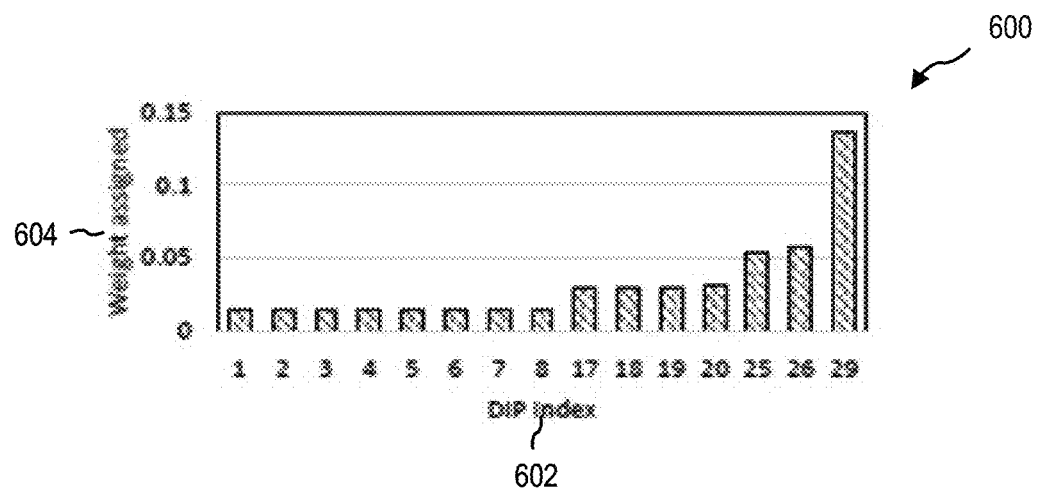
FIG. 6 illustrates an example graph of the weights calculated by an Integer Linear Program (ILP) in accordance with implementations of the present disclosure.

FIG. 6 illustrates an example graph 600 of the weights calculated by ILP. The graph 600 includes a DIP index on the x-axis 602 and the weights assigned on the y-axis 604. The capsense LB controller 210 (FIG. 2) uses the latency weight curves (e.g., the latency weight curves 506, 508, 510, 512) illustrated in the graph 500 as the input ($l\_\{d,w\}$) to the ILP equation (1) to calculate the weights for the DIPs. The ILP equation assigned more weight to the VMs with more capacity as illustrated in the graph 600.

Figure 7:
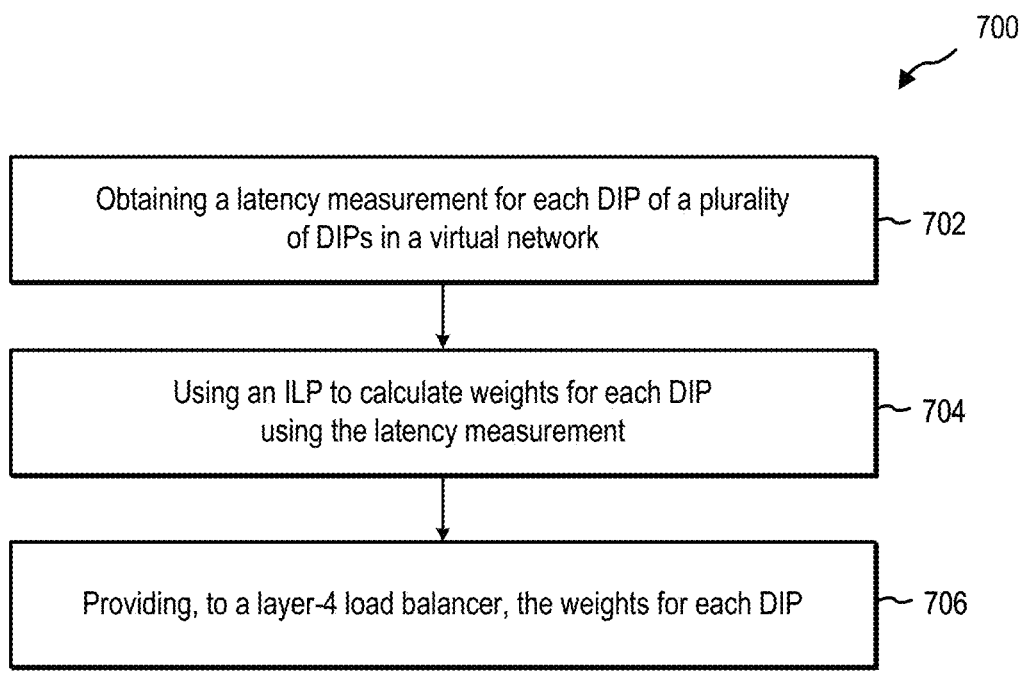
FIG. 7 illustrates an example method for capacity aware layer-4 load balancing in accordance with implementations of the present disclosure.

Referring now to FIG. 7, illustrated is an example method 700 for capacity aware layer-4 load balancing. The actions of the method 700 are discussed below with reference to FIG. 2.

At 702, the method 700 includes obtaining a latency measurement for each direct IP (DIP) of a plurality of DIPs in a virtual network. The latency measurement (e.g., the latency 24) provides an indication of a capacity for each DIP (e.g., $DIP_1$ 12 to $DIP_x$ 12). In some implementations, a capsense latency measurement (CLM) component 10, 16, 20 resides in each VNET. The CLM component (e.g., the CLM component 10) periodically measures the latency for requests from each DIP (e.g., $DIP_1$ 12 to $DIP_x$ 12). The latency 24 is measured for applications based on the uniform resource locator (URL) provided by the users. In some implementations, the CLM component 10 measures latency every 5 seconds using the application URL provided by the users. The latency 24 measurements are stored in a latency store 208. In some implementations, the latency 24 measurements are stored with the VIP 206 as the key and the value is a list of <DIP, latency, time> tuples. A capsense LB controller 210 reads the latencies (e.g., the latency 24) from the latency store 208.

At 704, the method 700 includes using an ILP to calculate a weight for each DIP using the latency measurement. The capsense LB controller 210 calculates the weights (e.g., the weights $30_1$ to $30_x$) for the DIPs (e.g., $DIP_1$ 12 to $DIP_x$ 12) using the latencies read from the latency store 208. The latencies provide an estimation of a capacity of the DIPs (e.g., higher latency reflects that a DIP is reaching capacity and a lower latency reflects that capacity remains in a DIP). The capsense LB controller 210 calculates the weights as per the capacities of the DIPs (e.g., $DIP_1$ 12 to $DIP_x$ 12) and uses the capacities to program the weights (e.g., the weights $30_1$ to $30_x$) for the DIPs (e.g., $DIP_1$ 12 to $DIP_x$ 12). The weights (e.g., the weights $30_1$ to $30_x$) identify an amount of traffic to provide to each DIP (e.g., $DIP_1$ 12 to $DIP_x$ 12).

In some implementations, the capsense LB controller 210 uses an integer linear program (ILP) to calculate the weights for each DIP (e.g., $DIP_1$) and the ILP minimizes a total latency of the plurality of DIPs (e.g., $DIP_1$ 12 to $DIP_x$ 12). The ILP packs the load per capacities of the DIPs (e.g., $DIP_1$ 12 to $DIP_x$ 12). In some implementations, the capsense LB controller 210 uses the equation (1) for the ILP to determine the weights (e.g., the weights $30_1$ to $30_x$) for each DIP (e.g., $DIP_1$ 12 to $DIP_x$ 12). In some implementations, an input to the ILP includes a plurality of latencies at different weights for each DIP and an output of the ILP is a single weight for each DIP (e.g., $DIP_1$ 12 to $DIP_x$ 12). In some implementations, the ILP includes constraints of applying one weight to each DIP, a total weight of the weights equals one, imbalance is allowed, and a minimum and maximum weight across the plurality of DIPs is specified. In some implementations, the capsense LB controller 210 calculates the weights to minimize the total latency across all DIPs (e.g., $DIP_1$ 12 to $DIP_x$ 12) of a VNET.

At 706, the method 700 includes providing, to a layer-4 load balancer, the weights for each DIP. The capsense LB controller 210 provides the weights $30_1$ to $30_x$ for each DIP (e.g., $DIP_1$ 12 to $DIP_x$ 12) to a layer-4 load balancer (e.g., the LB controller 212). The layer-4 load balancer programs the weights $30_1$ to $30_x$ for each DIP (e.g., $DIP_1$ 12 to $DIP_x$ 12) and uses the weights $30_1$ to $30_x$ to distribute traffic to the plurality of DIPs (e.g., $DIP_1$ 12 to $DIP_x$ 12). In some implementations, as the capacity changes for a DIP (e.g., $DIP_1$ 12 to $DIP_x$ 12), the capsense LB controller 210 updates the weight for the DIP (e.g., $DIP_1$ 12 to $DIP_x$ 12) in response to the changes in the capacity.

In some implementations, the capsense LB controller 210 schedules the weights (e.g., the weights $30_1$ to $30_x$) for each DIP (e.g., $DIP_1$ 12 to $DIP_x$ 12) to the layer-4 load balancer (e.g., the LB controller 212) using a priority of each DIP (e.g., $DIP_1$ 12 to $DIP_x$ 12). In some implementations, the capsense LB controller 210 includes a scheduler module that schedules the weights $30_1$ to $30_x$ in multiple rounds to send to the LB controller 212. For example, the weights $30_1$ to $30_x$ exceed a total weight of 1. Another example includes the scheduler module prioritizing certain latency measurements over other latency measurements.

The method 700 balances the load of the incoming traffic for the VNET as per capacities of the DIPs.

Figure 8:
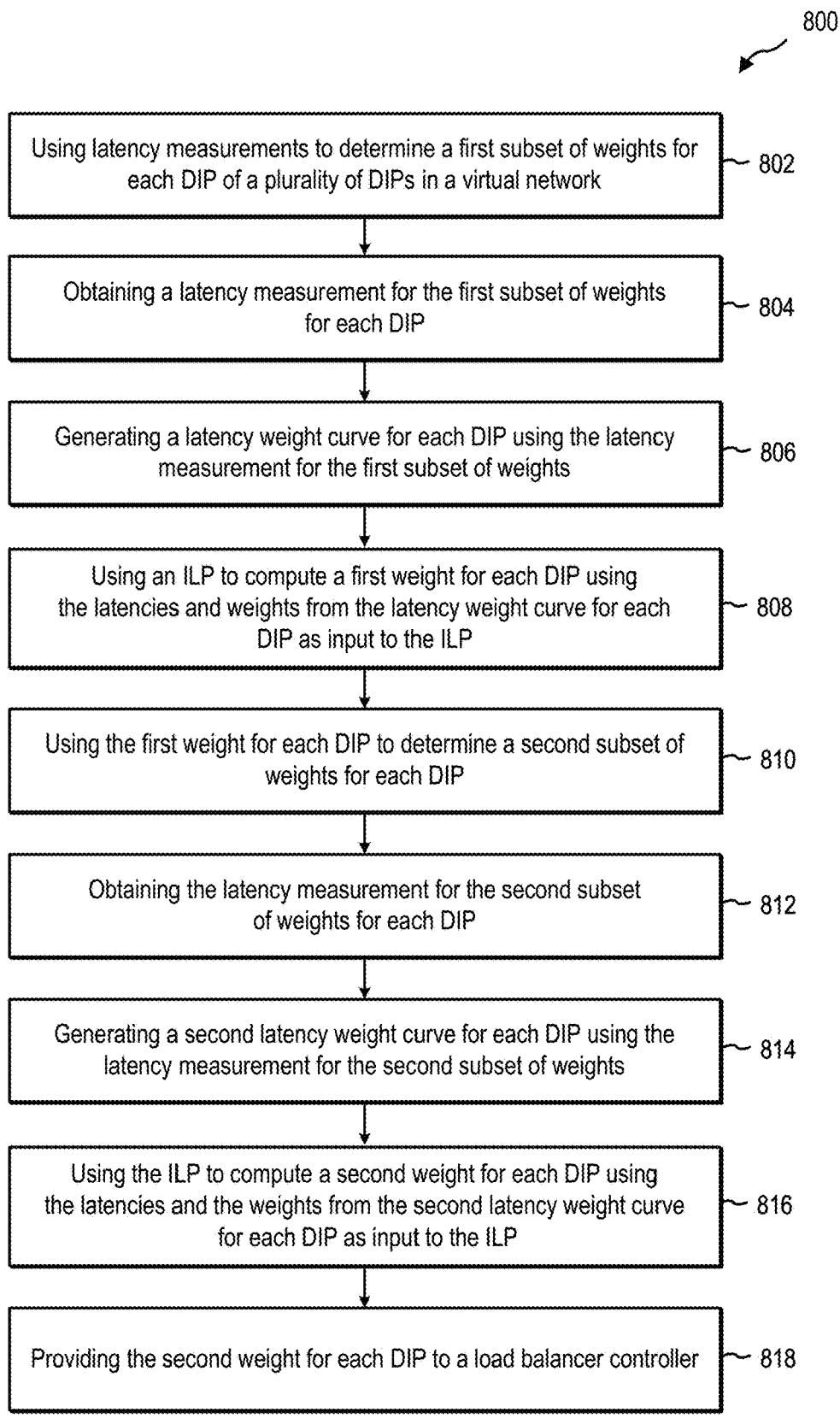
FIG. 8 illustrates an example method for using an Integer Linear Program (ILP) for calculating the weights for DIPs to use in load balancing in accordance with implementations of the present disclosure.

Referring now to FIG. 8, illustrated is an example method 800 for using an Integer Linear Program (ILP) for calculating the weights for DIPs to use in load balancing. The actions of the method 800 are discussed below with reference to FIG. 2.

At 802, the method 800 includes using latency measurements to determine a first subset of weights for each direct IP (DIP) of a plurality of DIPs in a virtual network. In some implementations, the capsense LB controller 210 includes a calculate weights for latency measurement module that determines a first subset of the weights (e.g., a small number of weights) for each DIP (e.g., $DIP_1$ 12 to $DIP_x$ 12) of a plurality of DIPs in a VNET for latency measurement.

In some implementations, the first subset of weights estimates a capacity of each DIP. In some implementations, the capacity is estimated based on if a packet drops for the DIP. For example, capacity for the DIP is reached in response to the packet dropping and capacity remains in the DIP in response to the packet not dropping.

In some implementations, the capsense LB controller 210 identifies a maximum weight for the DIP. The maximum weight for the DIP is a highest weight for the DIP where a packet did not drop. The maximum weight for the DIP provides an estimate of the DIP capacity in terms of weight. In some implementations, capsense LB controller 210 uses Algorithm 1 to calculate the maximum weight for each DIP (e.g., $DIP_1$ 12 to $DIP_x$ 12) in each iteration in the measurement phase.

The capsense LB controller 210 determines the first subset of weights for each DIP using the maximum weight. For example, the first subset of weights for each DIP includes a uniform distribution of weights from zero to the maximum weight. Different DIPs may have different capacities and a different maximum weight resulting in different subset of weights for each DIP.

At 804, the method 800 includes obtaining a latency measurement for the first subset of weights for each DIP. The capsense LB controller 210 obtains the latency (e.g., latency 24) measurement for the first subset of weights for each DIP (e.g., $DIP_1$ 12 to $DIP_x$ 12). For example, the capsense LB controller 210 reads the latencies (e.g., the latency 24) from the latency store 208 for the weights in the first subset of weights. In some implementations, the latency (e.g., the latency 24) measurement measures a latency for requests from each DIP (e.g., $DIP_1$ 12 to $DIP_x$ 12).

At 806, the method 800 includes generating a latency weight curve for each DIP using the latency measurement for the first subset of weights. The capsense LB controller 210 uses the weights in the first subset of weights in building the latency weight curve (e.g., the latency weight curves 406, 408, 410, 412) for each DIP. The capsense LB controller 210 obtains the latency measurements for small number of weights and uses curve fitting (x-axis=weight, y-axis=latency) using polynomial regression to build a latency weight curve.

The latency weight curve (e.g., the latency weight curves 406, 408, 410, 412) estimates latency measurements for weights other than the weights included in the first subset of weights. The capsense LB controller 210 uses the latency weight curve to estimate the latency for other values of weights where the capsense LB controller 210 did not make latency measurements directly. In some implementations, the latency weight curve is adjusted in response to detecting changes in traffic of the VNET or changes in the capacity for a DIP.

At 808, the method 700 includes using an integer linear program (ILP) to compute a first weight for each DIP using the latencies and weights from the latency weight curve for each DIP as input to the ILP. The capsense LB controller 210 uses the latency weight curve (e.g., the latency weight curves 406, 408, 410, 412) to get the values of $l_{d,w}$ for the input to the ILP equation (1). The latencies and weights from the latency weight curve (e.g., the latency weight curves 406, 408, 410, 412) are provided as the input to the ILP equation (1). The ILP minimizes a total latency of the plurality of DIPs. In some implementations, the ILP includes constraints of applying one weight to each DIP, a total weight of the weights equals one, imbalance is allowed, and a minimum and maximum weight across the plurality of DIPs is specified. In some implementations, a first subset of weights provides set of uniform weights for each DIP up to a maximum weight for the weights from the latency weight curve as input to the ILP equation (1). The output of the ILP equation (1) after the first pass provides is a first weight for each DIP. In some implementations, the first weight is an estimation of weight to assign to the DIPs based on the capacity of the DIP.

At 810, the method 800 includes using the first weight for each DIP to determine a second subset of weights for each DIP. The capsense LB controller 210 uses the first weight for each DIP provided as an output from the ILP equation (1) to determine a second subset of weights for each DIP. The capsense LB controller 210 determines a second subset of weights for each DIP within a range of the first weight (e.g., a portion above the first weight and a portion below the first weight). One example of the range includes a set of weights (e.g., 5 uniformly spaced weights) above the first weight and a set of weights (e.g., 5 uniformly spaced weights) below the first weight.

At 812, the method 800 includes obtaining the latency measurement for the second subset of weights for each DIP. The capsense LB controller 210 reads the latencies (e.g., the latency 24) from the latency store 208 for the weights in the second subset of weights.

At 814, the method 800 includes generating a second latency weight curve for each DIP using the latency measurement for the second subset of weights. The capsense LB controller 210 uses the second subset of weights to build the weight latency map to provide as input to the ILP for a second pass. The capsense LB controller 210 uses curve fitting using polynomial regression to build a second latency weight curve to estimate latency measurements for other values of weights where the capsense LB controller 210 did not make the latency measurements directly.

At 816, the method 800 includes using the ILP to compute a second weight for each DIP using latencies and weights from the second latency curve for each DIP as input to the ILP. The capsense LB controller 210 uses the second latency weight curve as the input ($l\_\{d,w\}$) to the ILP equation (1) to calculate the weights for the DIPs. The output of the ILP equation (1) is a weight for each DIP of a VIP (e.g., $W_1$ $30_1$ to $W_x$ $30_x$ for each $DIP_1$ 12 to $DIP_x$ 12). The weight provided from the second output of the IPL equation (1) may be more precise than the first weight provided from the first output of IPL equation (1). Running the ILP algorithm in two steps improves the ILP running time while maintaining the accuracy of the ILP algorithm.

At 820, the method 800 includes providing the second weight for each DIP to a load balancer controller. The capsense LB controller 210 sends the weight (e.g., $W_1$ $30_1$ to $W_x$ $30_x$) for each DIP (e.g., $DIP_1$ 12 to $DIP_x$ 12) to the LB controller 212. The weights (e.g., $W_1$ $30_1$ to $W_x$ $30_x$) identify an amount of traffic to provide to each DIP (e.g., $DIP_1$ 12 to $DIP_x$ 12). The load balancer controller 212 programs MUXes in a load balancer dataplane 204 with the weights (e.g., $W_1$ $30_1$ to $W_x$ $30_x$) and the MUXes use the weights (e.g., $W_1$ $30_1$ to $W_x$ $30_x$) to distribute traffic to the plurality of DIPs (e.g., $DIP_1$ 12 to $DIP_x$ 12).

In some implementations, the capsense LB controller 210 schedules the weights (e.g., $W_1$ $30_1$ to $W_x$ $30_x$) for each DIP (e.g., $DIP_1$ 12 to $DIP_x$ 12) to the load balancer controller 212 in multiple rounds to ensure that a sum of the weights for each DIP equals one. In some implementations, the capsense LB controller 210 schedules the weights for each DIP to the load balancer controller 212 by placing each DIP in an order based on a priority of each DIP. For example, the priority includes the weights for over-utilized DIPs, the weights for remaining DIPs, or the weights during a refresh.

The method 800 may repeat for each VIP (e.g., $VIP_2$ $206_2$ up to $VIP_n$ $206_n$) so that the weights are calculated for each DIP in each VIP (e.g., $DIP_2$ 18 to $DIP_y$ 18 in $VIP_2$ $206_2$ up to $DIP_1$ 22 to $DIP_z$ 22 in $VIP_n$ $206_n$). The method 800 uses the ILP to model load balancing as load packing and packs the load based on the capacities of the DIPs (e.g., $DIP_1$ 12 to $DIP_x$ 12) to minimize the total latency.

As illustrated in the foregoing discussion, the present disclosure utilizes a variety of terms to describe features and advantages of the methods and systems. Additional detail is now provided regarding the meaning of such terms. For example, as used herein, a "machine learning model" refers to a computer algorithm or model (e.g., a classification model, a clustering model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    obtaining a latency measurement for each direct internet protocol (IP) (DIP) of a plurality of DIPs in a virtual network, wherein the latency measurement provides an indication of a capacity for each DIP;
    generating a latency weight curve for each DIP using the latency measurement for a first subset of weights;
    identifying, from the latency weight curve, latencies and weights for each DIP;
    using an integer linear program (ILP) to calculate a first weight for each DIP using the latencies and weights from the latency weight curve;
    using the first weight for each DIP to determine a second subset of weights for each DIP;
    obtaining the latency measurement for the second subset of weights for each DIP;
    generating a second latency weight curve for each DIP using the latency measurement for the second subset of weights;
    identifying, from the second latency weight curve, the latencies and the weights for each DIP;
    using the ILP to calculate a second weight for each DIP using the latencies and the weights from the second latency weight curve; and
    providing, to a layer-4 load balancer, the second weight for each DIP, wherein the second weight identifies an amount of traffic to provide to each DIP.

2. The method of claim 1, wherein the layer-4 load balancer programs the second weight for each DIP and uses the second weight to distribute traffic to the plurality of DIPs.

3. The method of claim 1, wherein the latency measurement is obtained from a component on each DIP measuring an application latency for each DIP.

4. The method of claim 1, wherein the ILP minimizes a total latency of the plurality of DIPs.

5. The method of claim 4, wherein an input to the ILP includes a plurality of latencies at different weights for each DIP and an output of the ILP is a single weight for each DIP.

6. The method of claim 4, wherein the ILP includes constraints of applying one weight to each DIP, a total weight of the weights equals one, imbalance is allowed, and a minimum and maximum weight across the plurality of DIPs is specified.

7. The method of claim 1, wherein as capacity changes for a DIP, a weight for the DIP is updated in response to changes in the capacity.

8. The method of claim 1, further comprising:
scheduling the second weight for each DIP to the layer-4 load balancer using a priority of each DIP.

9. A method, comprising:
using latency measurements to determine a first subset of weights for each direct internet protocol (IP) (DIP) of a plurality of DIPs in a virtual network;
obtaining a latency measurement for the first subset of weights for each DIP;
generating a latency weight curve for each DIP using the latency measurement for the first subset of weights;
identifying, from the latency weight curve, latencies and weights for each DIP;
using an integer linear program (ILP) to compute a first weight for each DIP using the latencies and the weights from the latency weight curve for each DIP as input to the ILP, wherein the first weight is an estimation of a weight for each DIP;
using the first weight for each DIP to determine a second subset of weights for each DIP;
obtaining the latency measurement for the second subset of weights for each DIP;
generating a second latency weight curve for each DIP using the latency measurement for the second subset of weights;
identifying, from the second latency weight curve, the latencies and the weights for each DIP;
using the ILP to compute a second weight for each DIP using the latencies and the weights from the second latency weight curve for each DIP as input to the ILP; and
providing the second weight for each DIP to a load balancer controller, wherein the second weight identifies an amount of traffic to provide to each DIP.

10. The method of claim 9, wherein the load balancer controller programs MUXes in a load balancer dataplane with the second weight for each DIP and the MUXes use the second weight for each DIP to distribute a portion of traffic to the plurality of DIPs based on the second weight.

11. The method of claim 9, wherein the first subset of weights estimates a capacity of each DIP.

12. The method of claim 11, wherein the capacity is reached in response to a packet dropping for a DIP and the capacity remains in the DIP in response to the packet not dropping for the DIP.

13. The method of claim 9, wherein the first subset of weights provides a set of uniform weights for each DIP up to a maximum weight for which a packet did not drop.

14. The method of claim 9, wherein the second subset of weights provides a portion of weights above the first weight and a portion of weights below the first weight.

15. The method of claim 9, wherein the latency measurement measures a latency for requests from each DIP.

16. The method of claim 9, wherein the ILP minimizes a total latency of the plurality of DIPs.

17. The method of claim 9, wherein the ILP includes constraints of applying one weight to each DIP, a total weight of the weights equals one, imbalance is allowed, and a minimum and maximum weight across the plurality of DIPs is specified.

18. The method of claim 9, wherein the latency weight curve is adjusted in response to detecting changes in traffic of the virtual network or changes in a capacity for a DIP.

19. The method of claim 9, further comprising:
scheduling the weight for each DIP to the load balancer controller by placing each DIP in an order based on a priority of each DIP, wherein the priority is one of the weights for over-utilized DIPs, the weights for remaining DIPs, or the weights during a refresh.

20. The method of claim 9, further comprising:
scheduling the weight for each DIP to the load balancer controller in multiple rounds to ensure that a sum of the weights equals one.

* * * * *